United States Patent Office 2,936,262
Patented May 10, 1960

2,936,262
DIELS-ALDER ADDUCT OF TETRACHLOROCYCLOPENTADIENE WITH QUINONE AS A FUNGICIDE

Everett E. Gilbert, Morris Township, Morris County, N.J., assignor to Allied Chemical Corporation, a corporation of New York No Drawing. Application October 10, 1957
Serial No. 689,256

11 Claims. (Cl. 167—30)

This invention relates to combating fungus. More specifically this invention is directed to a method of combating fungi, especially plant disease fungi, involving use of fungicidal compositions containing as active ingredient the Diels-Alder adduct of tetrachlorocyclopentadiene and quinone. Additionally the invention is concerned with the fungicidal compositions themselves.

It has now been found that fungus or fungi can be very effectively combated by applying the Diels-Alder adduct of tetrachlorocyclopentadiene and quinone to the locus to be protected therefrom. The Diels-Alder adduct is utilized herein in toxic amount (to fungus) or amount sufficient to exert fungicidal action. Living plants are protected by virtue of this invention without injury thereto.

The instant Diels-Alder adduct active agent or ingredient can be applied by spraying, dusting or by other suitable means. It can be spray applied in the form of aqueous dispersions or emulsions or as solutions in organic liquid solvents, e.g. kerosene or xylol. Aqueous dispersions have typical concentrations from about 0.025% to 1% by weight of this Diels-Adler adduct. Solutions have typical weight concentrations from about 0.5% to 20% of the adduct.

The Diels-Alder active agent can be dust applied when combined with solid powders or dusts, e.g. talc, wood flour, kaolin, sulfur, and pumice. Dusts typically contain from about 0.5% to 10% by weight of the active fungicidal ingredient.

Aqueous emulsions suitable for spraying can be prepared by emulsifying in water solutions of the Diels-Alder active ingredient in a water-insoluble organic liquid solvent, e.g., xylene, methylated naphthalene, or mixtures thereof. These solutions or compositions prior to emulsifying usually contain, in proportions by weight, about 20% to 80% of the Diels-Alder fungicidal agent, about 1% to 10% of emulsifying agent and the balance solvent for the fungicidal and emulsifying agents. These solutions can be mixed with water in typical amounts of from 1 pint to 1 gallon per 100 gallons water to form the sprayable emulsions. Sprayable aqueous dispersions may be prepared by mixing with water solutions of the Diels-Alder fungicidal agent and an emulsifying agent in a water-soluble organic solvent, e.g. acetone, diacetone alcohol, ethyl alcohol, or mixtures thereof. These solutions prior to dispersing typically contain the Diels-Alder agent, emulsifying agent, and solvent for these agents in weight proportions within the percentage ranges previously stated with regard to emulsion preparation. Sprayable aqueous dispersions can also be prepared by mixing with water finely divided water-dispersible fungicidal powders containing the fungicidal agent and suitable wetting and/or dispersing agents. Water-dispersible powders can contain, in proportions by weight, about 20% to 80% of the instant Diels-Alder fungicidal agent, about 0.5% to 3% of wetting and/or dispersing agent, and the balance powdered solid diluent or carrier such as the powders previously mentioned. The dispersible powders are mixed or dispersed in water in typical amounts of from 1 to 8 pounds per 100 gallons of water.

Water-dispersible powders can be prepared by milling solid Diels-Alder active agent together with the solid carrier and wetting and/or dispersing agents to a typical particle size of from about 1 to 30 microns. Alternatively, the dispersible powder can be made by impregnation of the active agent on the powder as a melt or from solution. The previously mentioned solid fungicidal powders or dusts suitable for dusting application can be similarly prepared by milling or impregnating.

Suitable wetting and dispersing agents for use herein include sodium lignosulfonate, calcium lignosulfonate, sodium-N-methyl-N-oleoyl taurate. Suitable emulsifying agents include "Triton X–155," an alkyl aryl polyether alcohol; and blends of "Triton 151" and "Triton X–171" which are blends of alkyl aryl polyether alcohols with organic sulfonates.

The Diels-Alder adduct of tetrachlorocyclopentadiene and quinone or p-benzoquinone has structural formula as follows:

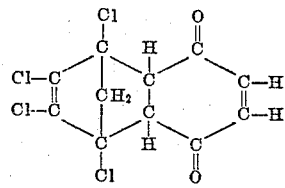

It is a pale yellow crystalline solid melting at about 167–168° C. Its synthesis is reported in J. Am. Chem. Soc., 77, p. 86 (1955).

The following example in which parts are by weight unless otherwise specified illustrates a specific method of preparing the compound:

806 parts of 1,2,3,4-tetrachlorocyclopentadiene - 1,3 were mixed with 427 parts p-benzoquinone and 1360 parts of ethylbenzene in a 3 liter, 3 necked flask fitted with a thermometer and reflux condenser. This reaction mixture was refluxed for 5 hours. It was then cooled and filtered for recovery of the yellow crystalline product. The crystals were washed twice with ethanol, yielding 694 parts of the Diels-Alder adduct of 1,2,3,4-tetrachlorocyclopentadiene - 1,3 and p-benzoquinone which melted at 171°–172° C.

*Analysis.*—Calculated for Cl=45.5%. Found for Cl=45.6%.

The importance of this invention and the technical advance afforded thereby will be appreciated from the following:

Tests were conducted for protection against apple scab fungus on live McIntosh apple plants or trees of from 6 to 15 inches tall. The Diels-Alder adduct prepared as previously described was dissolved in acetone to provide a solution of 1% concentration by weight. 0.5 part of "Triton X–155" emulsifying agent was then added to 100 parts of this fungicidal solution to improve or maintain emulsification on mixing with water. The solution was then diluted with water in the water to solution volume ratio of 9:1 respectively to provide a dispersion of 0.1% concentration by weight of fungicide. This aqueous dispersion was sprayed on the apple plants to cover the foliage with fine droplets. About 10 to 20 cc. of dispersion per plant was used.

Inoculum of *Venturia inaequalis* (apple scab) conidia were obtained from active lesions on apple leaves from plants infected with the same and were atomized onto the sprayed plant after the spray had dried.

The amount of apple scab infection was recorded 14 days after the date of inoculation with *Venturia inaequalis* during which the plants had been subjected to high humidity and temperature conducive to germination of the fungus. The number of plants that showed infection and the estimated percentage of leaf area that was infected were recorded at this time and compared with data noted with respect to plants which were subjected to substantially identical conditions except that the fungicide of this invention was not applied to them. The plants which had been sprayed with fungicide were not injured. The following results were obtained:

*Infection with apple scab*

| Compound | Percent of Plants Infected | Percent Leaf Area Infected |
|---|---|---|
| Diels-Alder adduct of Tetrachlorocyclopentadiene and p-benzoquinone | 0 | 0 |
| Untreated | 100 | 56 |

Tests were also conducted for protection against tomato late blight on live window box tomato plants of from about 4 to 6 inches tall. An aqueous dispersion of 0.1% concentration of the Diels-Alder adduct of this invention prepared as previously described was sprayed onto the foliage of the tomato plants utilizing a substantially identical spraying procedure as previously described with respect to the apple scab protection tests. Approximately 10 to 20 cc. of dispersion per plant was used.

An inoculum of *Phytophthora infestans* zoospores, which are pathogenic to tomatoes, was then atomized onto the sprayed plants after the spray had dried.

The amount of plant defoliation was recorded 7 days after the date of inoculation with the fungus during which the plants had been subjected to high humidity and temperature conducive to fungus germination. The estimated percentage of plant defoliation was recorded at this time and compared with data noted with respect to plants which were not treated with the fungicide of this invention and which were subjected to substantially identical conditions conducive to fungus germination. No injury was found on plants which had been sprayed with fungicide. The recorded results follow:

*Tomato late blight tests*

| Compound | Percent Defoliation |
|---|---|
| Diels-Alder adduct of Tetrachlorocyclopentadiene and p-benzoquinone | 0 |
| Untreated | 90-95 |

The Diels-Alder adduct fungicide of this invention was also found effective for combating *Sclerotinia fructicola* (brown rot of stone fruits). *Sclerotinia fructicola* spores were added to an aqueous dispersion of 0.1% concentration of the instant Diels-Alder adduct prepared as previously described. A similar quantity of these spores were added to water alone. The separate spore mixtures were incubated at 65° C. After an incubation period of 24 hours at 65° C. the fungicide containing mixture was examined under the microscope to determine percent germination of spores. No spore germination was noted in the Diels-Alder adduct containing mixture. On the contrary, an 82 percent spore germination was noted in the water mixture not containing the adduct.

What is claimed is:

1. A method of combating plant fungi which comprises applying a fungicidal composition comprising from about 0.025% to 80% by weight of the compound represented by the formula

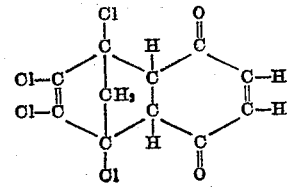

as active fungicidal ingredient, and a fungicidal adjuvant as a carrier therefor to a plant to be protected from plant fungus.

2. A method of protecting apple trees against attack by apple scab which comprises applying a fungicidal composition comprising from about 0.025% to 80% by weight of the compound represented by the formula

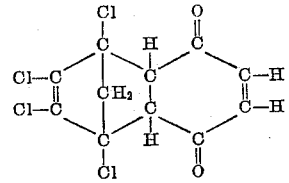

as active fungicidal ingredient, and a fungicidal adjuvant as a carrier therefor to the apple tree to be protected.

3. A method of protecting tomato plants against attack by tomato late blight which comprises applying a fungicidal composition comprising from about 0.025% to 80% by weight of the compound represented by the formula

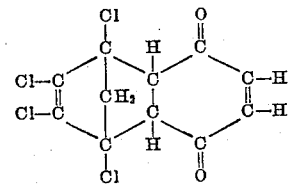

as active fungicidal ingredient, and a fungicidal adjuvant as a carrier therefor to the tomato plant to be protected.

4. A method of protecting apple trees against attack by apple scab which comprises spraying onto the apple tree to be protected a fungicidal aqueous emulsion obtained by mixing with water in the proportion of from 1 pint to 1 gallon per 100 gallons of the water a composition containing from about 20% to 80% by weight of a compound represented by the formula

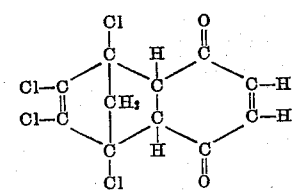

as active fungicidal ingredient, from about 1% to 10% by weight of an emulsifying agent, and the balance water-insoluble organic liquid solvent for the fungicidal compound and the emulsifying agent.

5. A method of protecting apple trees against attack by apple scab which comprises spraying onto the apple tree to be protected a fungicidal aqueous dispersion obtained by dispersing in water in the proportion of from 1 to 8 pounds per 100 gallons of the water a water-dispersible fungicidal powder containing from about 20% to 80% by weight of a compound represented by the formula

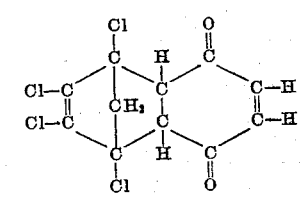

as active fungicidal ingredient, from about 0.5% to 3% by weight of wetting and dispersing agents, and the balance powdered solid carrier as a fungicidal adjuvant for the fungicidal compound and the wetting and dispersing agents.

6. A method of protecting apple trees against attack by apple scab which comprises dusting the apple tree to be protected with a fungicidal dust comprising from about 0.5% to 10% by weight of a compound represented by the formula

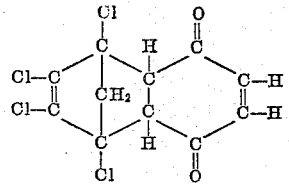

as active fungicidal ingredient combined with a powdered solid carrier as a fungicidal adjuvant therefor.

7. A method of protecting tomato plants against attack by tomato late blight which comprises spraying onto the tomato plant to be protected a fungicidal aqueous emulsion obtained by mixing with water in the proportion of from 1 pint to 1 gallon per 100 gallons of the water a composition containing from about 20% to 80% by weight of a compound represented by the formula

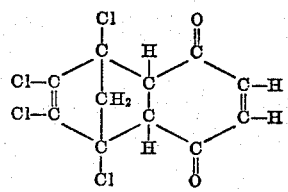

as active fungicidal ingredient, from about 1% to 10% by weight of an emulsifying agent, and the balance water-insoluble organic liquid solvent for the fungicidal compound and the emulsifying agent.

8. A method for protecting tomato plants against attack by tomato late blight which comprises spraying onto the tomato plant to be protected a fungicidal aqueous dispersion obtained by dispersing in water in the proportion of from 1 to 8 pounds per 100 gallons of the water a water-dispersible fungicidal powder containing from about 20% to 80% by weight of a compound represented by the formula

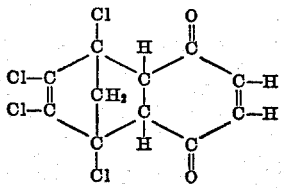

as active fungicidal ingredient, from about 0.5% to 3% by weight of wetting and dispersing agents, and the balance powdered solid carrier as a fungicidal adjuvant for the fungicidal compound and the wetting and dispersing agents.

9. A method of protecting tomato plants against attack by tomato late blight which comprises dusting the tomato plant to be protected with a fungicidal dust comprising from about 0.5% to 10% by weight of a compound represented by the formula

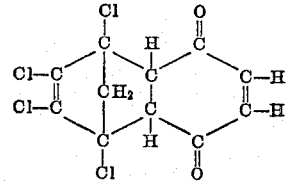

as active fungicidal ingredient combined with a powdered solid carrier as a fungicidal adjuvant therefor.

10. A fungicidal aqueous emulsion adapted for application to plants obtained by mixing with water in the proportion of from 1 pint to 1 gallon per 100 gallons of the water a composition containing from about 20% to 80% by weight of a compound represented by the formula

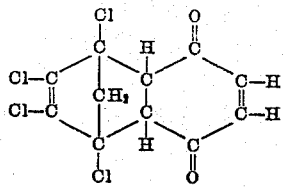

as active fungicidal ingredient, from about 1% to 10% by weight of an emulsifying agent, and the balance water-insoluble organic liquid solvent for the fungicidal compound and the emulsifying agent.

11. A fungicidal aqueous dispersion adapted for application to plants obtained by dispersing in water in the proportion of from 1 to 8 pounds per 100 gallons of the water a water-dispersible fungicidal powder containing from about 20% to 80% by weight of a compound represented by the formula

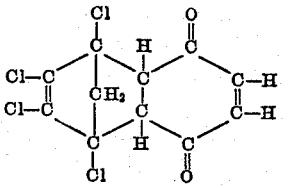

as active fungicidal ingredient, from about 0.5% to 3% by weight of wetting and dispersing agents, and the balance powdered solid carrier as a fungicidal adjuvant for the fungicidal compound and the wetting and dispersing agents.

References Cited in the file of this patent

UNITED STATES PATENTS

| | | |
|---|---|---|
| 2,507,207 | Hyman | May 9, 1950 |
| 2,507,208 | Hyman | May 9, 1950 |
| 2,886,577 | Fan | May 12, 1959 |

FOREIGN PATENTS

| | | |
|---|---|---|
| 501,269 | Canada | Apr. 20, 1954 |

OTHER REFERENCES

J.A.C.S., 77, 86 (1955).